US009838253B2

(12) United States Patent
Wang et al.

(10) Patent No.: US 9,838,253 B2
(45) Date of Patent: Dec. 5, 2017

(54) OBJECT-ORIENTED NETWORK VIRTUALIZATION

(71) Applicant: Fujitsu Limited, Kawasaki-shi, Kanagawa (JP)

(72) Inventors: Xi Wang, Murphy, TX (US); Motoyoshi Sekiya, Richardson, TX (US); Paparao Palacharla, Richardson, TX (US); Qiong Zhang, Plano, TX (US); Inwoong Kim, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 14/575,951

(22) Filed: Dec. 18, 2014

(65) Prior Publication Data
US 2015/0295761 A1  Oct. 15, 2015

Related U.S. Application Data

(60) Provisional application No. 61/977,991, filed on Apr. 10, 2014.

(51) Int. Cl.
*G06F 15/16* (2006.01)
*H04L 12/24* (2006.01)

(52) U.S. Cl.
CPC ...... *H04L 41/0806* (2013.01); *H04L 41/0233* (2013.01); *H04L 41/04* (2013.01)

(58) Field of Classification Search
CPC ........... G06F 9/455; G06F 2009/45562; G06F 2009/45595; G06F 2009/465; H04L 12/4641; H04L 41/12; H04L 41/0233
See application file for complete search history.

(56) References Cited

U.S. PATENT DOCUMENTS

| | | | | |
|---|---|---|---|---|
| 2012/0158938 A1* | 6/2012 | Shimonishi | ......... | G06F 9/45558 709/223 |
| 2012/0294617 A1* | 11/2012 | Miyamura | .............. | H04L 41/12 398/79 |
| 2013/0132532 A1* | 5/2013 | Zhang | ................. | H04L 41/0823 709/220 |
| 2013/0283265 A1* | 10/2013 | Acharya | ............. | G06F 9/45558 718/1 |

(Continued)

FOREIGN PATENT DOCUMENTS

WO  03/090087 A2  10/2003  ............. G06F 12/00

OTHER PUBLICATIONS

Open Network Summit, ONS Tutorial: SDN for Engineers Overview, 2 pages, [online], http://www.opennetsummit.org/archives/apr13/site/tutorials.html, Apr. 2013.

(Continued)

*Primary Examiner* — Tauqir Hussain
*Assistant Examiner* — Kamran Mohammadi
(74) *Attorney, Agent, or Firm* — Baker Botts L.L.P.

(57) ABSTRACT

Object-oriented network virtualization may involve creating and operating virtual network objects (VNO) using a software-programmed networking operating system (SPN OS). A VNO may be a complete representation of a virtual network service provided under the SPN OS. A VNO may have a unique identity and properties, along with an internal set of methods for executing functionality encapsulated by the VNO. A VNO may exhibit persistence and autonomous control to enable improved virtual network services.

20 Claims, 5 Drawing Sheets

(56) References Cited

U.S. PATENT DOCUMENTS

2014/0059226 A1 2/2014 Messerli et al.
2015/0249574 A1* 9/2015 Zhang ...................... G06F 9/54
                                                    709/223

OTHER PUBLICATIONS

OpenFlow, "OpenFlow Tutorial", [online], 46 pages, http://archive.openflow.org/wk/index.php/OpenFlow_Tutorial, 2011.
Keller et al., "Live Migration of an Entire Network (and its Hosts)", Hotnets '12, 6 pages, Oct. 2012.
Rexford et al., "Frenetic: A Programming Language for OpenFlow Networks", www.frenetic-lang.org, 18 pages, Oct. 2011.
European Search Report, Application No. 15159181.5, 6 pages, dated Sep. 2, 2015.

* cited by examiner

OBJECT-ORIENTED NETWORK VIRTUALIZATION

RELATED APPLICATION

This application claims the benefit under 35 U.S.C. §119 (e) of U.S. Provisional Application Ser. No. 61/977,991 filed Apr. 10, 2014 entitled "OBJECT ORIENTED NETWORK VIRTUALIZATION."

BACKGROUND

Field of the Disclosure

The present disclosure relates to communication networks, and more specifically, to object-oriented network virtualization.

Description of the Related Art

As more applications are provided as networked services (referred to as "cloud applications") from data center infrastructure (referred to as "the cloud"), the cloud applications are executed on shared physical infrastructure and may be viewed as "tenants" in a multi-tenant cloud. For example, the cloud may represent distributed datacenter infrastructure that includes computing resources and intra-datacenter networks inside each datacenter, along with inter-datacenter optical networks connecting geographically dispersed datacenters. Virtualization of computing resources has emerged as a key technology for the cloud and may enable multiple tenants to efficiently share both computing and network resources. The standard abstraction architecture in virtualization of computing resources involves virtual machines (VMs) executing on a hypervisor. An abstraction may be a representation of an entity that is selected in terms of particular criteria or characteristics, while other characteristics irrelevant to the selection criteria are hidden or summarized. As used herein, a "virtualization" may represent an abstraction whose selection criterion is dedication of resources to a particular client or application.

Software-defined networking (SDN) represents an important step towards network virtualization and abstraction and may allow for a logical network entity to be instantiated automatically using software instructions, rather than manually from user input. In this manner, SDN may enable flexible definition of virtual networks. For example, using the OpenFlow communications protocol managed by The Open Network Foundation (ONF), a traffic flow entity may be instantiated using an arbitrary combination of layer identifiers defined in a header space. OpenFlow may use various combinations of traffic identifiers (Internet-protocol (IP) addresses, media access controller (MAC) addresses, port addresses, etc.) at various layers to define a traffic flow. Then, by installing and configuring packet-forwarding rules associated with the traffic flow to physical switches, an OpenFlow controller may ensure that the traffic flow entity instantiates a path that is routed through a network including the physical switches.

In a somewhat similar manner to a VM executing on a hypervisor, OpenFlow's FlowVisor may instantiate a virtual network entity (referred to as a "slice") by associating multiple traffic flow entities with a given slice, whereby each slice is managed by a separate tenant controller, allowing the tenant to control over a portion of network traffic and a subset of the physical network. In OpenFlow, multiple flowspaces may be defined for each network switch. Each flowspace may be associated with a slice, which in turn is managed by a separate controller. FlowVisor may ensure that actions in one slice do not affect another by intercepting and rewriting OpenFlow messages.

However, SDN in general (and OpenFlow in particular) may not provide a desired level of abstraction for certain network resources. For example, SDN may define properties for a logical network entity, but may not allow for the logical network entity to have its own behaviors. Due to the centralized control architecture typically used with SDN, the behaviors of a logical network entity (such as packet-forwarding rules) may be externally controlled by a SDN controller and not by the logical network entity itself. By analogy to virtualization, the instantiation of a logical network entity in SDN may allocate network resources to the logical network entity (similar to creating a VM), while preventing the logical network entity from independently launching processing functionality (analogous to forcing each computing task of each VM to be launched externally from the hypervisor). Thus, the instantiation of logical network entities may be associated with scalability challenges using SDN. Certain limitations of SDN may further be observed for introducing circuit-oriented control and optical layer constraints, among other examples. Thus, more efficient and scalable solutions than SDN may be desired to support numerous concurrent virtual network entities with a wide variety of abstractions, while allowing each virtual network to execute highly-flexible and speedy control logic on its own network slice.

SUMMARY

In one aspect, a disclosed method for providing virtual network services includes instantiating a virtual network object in an operating system supporting software-programmed networking. The virtual network object may represent a virtual network service provided to a user of the operating system. The virtual network service may specify virtual nodes and virtual links in a virtual network based on a physical network. The method may include enabling the user to communicate with the virtual network object using an application programming interface supported by the operating system. The method may further include enabling the operating system to send control commands to the physical network to control physical network resources. The virtual network object may include an identifier, properties, and internal methods for functionality encapsulated by the virtual network object.

In particular embodiments, the method operation of instantiating the virtual network object includes receiving, at the operating system, an instantiation command from the user to instantiate the virtual network object. The instantiation command may include parameters specifying attributes of the virtual network object. Responsive to the instantiation command, the method may include performing, by an arbiter included in the operating system, verification of the virtual network object, including a sanity check and a serviceability check of the virtual network object. When the verification of the virtual network object is successful, the method may include generating, by the arbiter, a service proposition for the virtual network object, including valid service patterns for the virtual network object.

Additional disclosed aspects include an object oriented network virtualization (OONV) controller for providing virtual network services, and a network including the OONV controller, as described herein.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
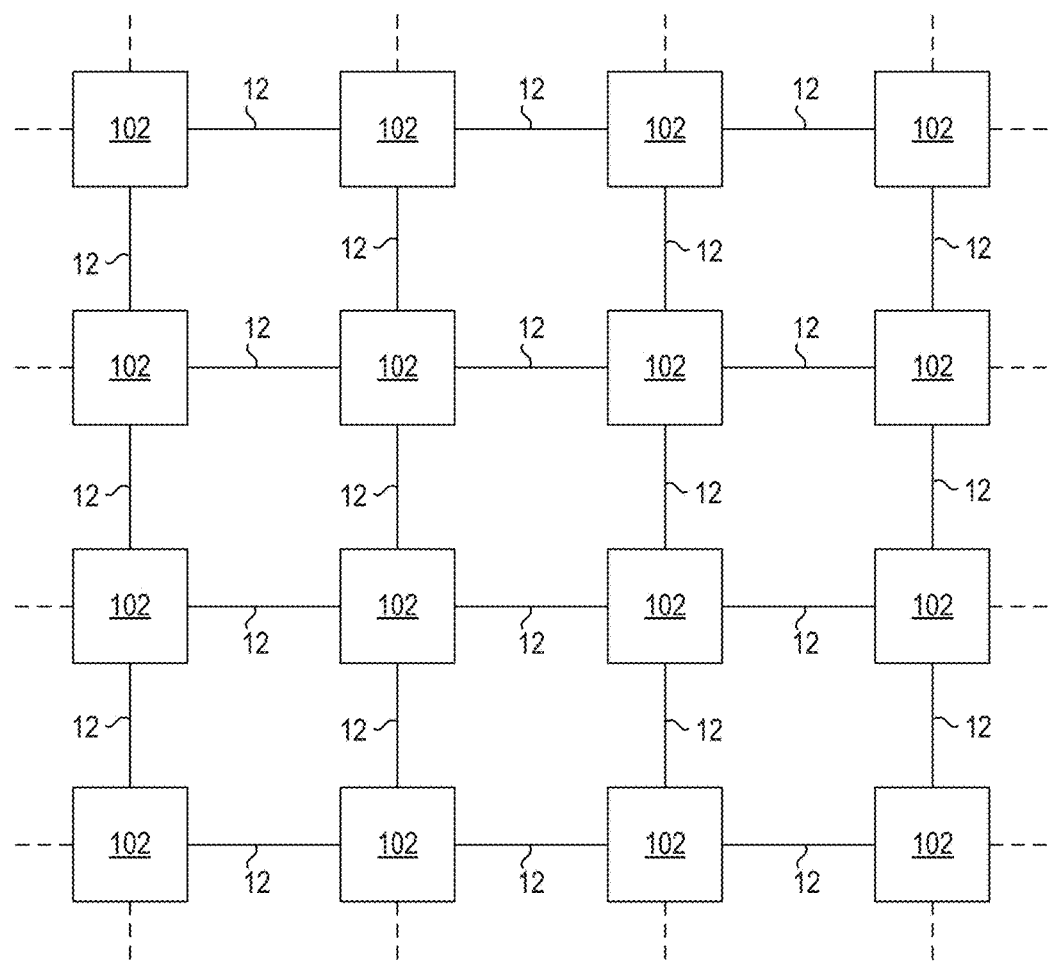
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may transmitted deterministically (also referred to as 'real-time') and/or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100 may employ object-oriented (OO) network virtualization, as described herein. Specifically, network 100 may be enabled for software-programmed networking (SPN) including creation of virtual network entities that are virtual network objects (VNOs) and executing an SPN operating system (see FIG. 2). The SPN operating system may be executed by a network controller. Each VNO may have unique identities, properties, and behaviors, as desired. In contrast to logical network entities, such as flow entities created by SDN, for example, using OpenFlow, OO network virtualization, as described herein, may define both properties and behaviors for VNOs. The behaviors of a VNO may represent a set of methods by which the VNO can internally execute functionality. Furthermore, persistence and autonomous control for VNOs may be implemented in OO network virtualization, as described herein. Persistence of a VNO may provide native support for circuit-oriented functions such as scheduling, protection, restoration, or combinations thereof, among other functions. Autonomous control of a VNO may include self-monitoring, self-adaptation, self-optimization, or combinations thereof, among other types of control.

Figure 2:
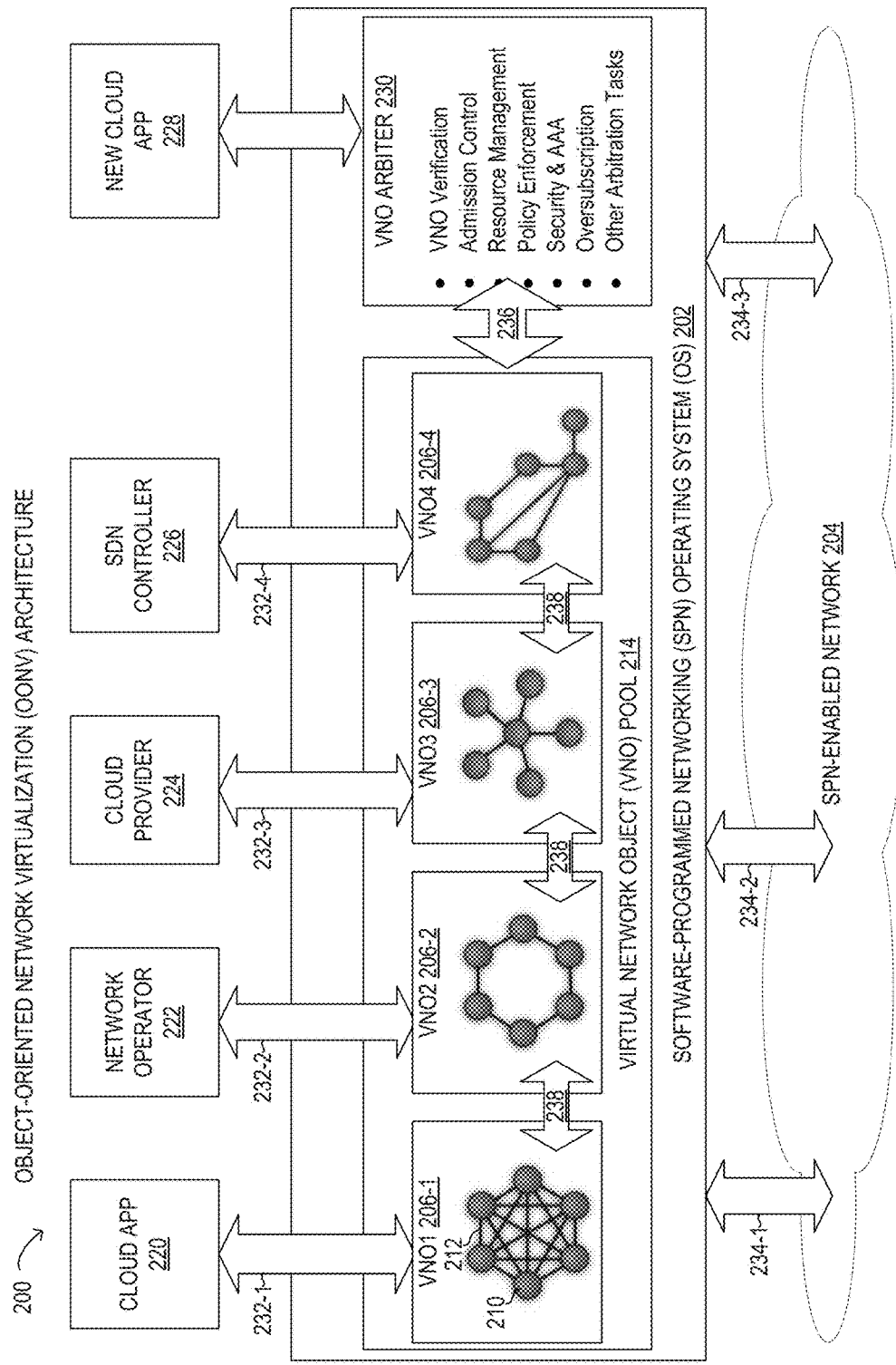
FIG. 2 is a block diagram of selected elements of an embodiment of a network architecture for object-oriented network virtualization.

Referring now to FIG. 2, a block diagram of selected elements of an embodiment of OO network virtualization (OONV) architecture 200 is illustrated. OONV architecture 200 in FIG. 2 may be implemented in network 100 (see FIG. 1), for example, using an OONV controller (see FIG. 5).

In FIG. 2, OONV architecture 200 may include software-programmed networking (SPN) operating system (OS) 202, which may represent a core platform for OONV. In different embodiments, SPN OS 202 may be executed using OONV controllers, using logically-centralized dedicated servers and corresponding VMs, using one or more network element(s) 102, or may be implemented as a network function using network function virtualization (NFV).

As shown in FIG. 2, OONV architecture 200 may support different types of underlying networks which may be supported by SPN OS 202. As referred to herein, "SPN-enabled network 204" may represent a physical network (or a virtualized physical network) that is operated and managed by SPN OS 202. It is noted that, in certain embodiments, SPN-enabled network 204 may represent hierarchical network architectures or recursive network architectures or combinations thereof (not shown). For example, a lower-level SPN OS may manage an associated physical network and may present a virtual network to an upper-level SPN OS, while the upper-level SPN OS may, in turn, treat the lower level virtual network as a corresponding physical network and may provide virtual network services to tenants of the upper-level SPN OS.

An operator that operates SPN OS 202 and SPN-enabled network 204 to provide SPN-based virtual network services may be referred to as an "SPN service provider". An "SPN tenant" may refer to a user that uses SPN-based virtual network (VN) services and owns VNs residing in SPN-enabled network 204. Each VN service offered to a SPN tenant may be represented as virtual network object (VNO) 206 in SPN OS 202, while the SPN tenant may be referred to as the "VNO owner" of the virtual network object. As shown representatively in VNO1 206-1, VNOs 206 may be represented by virtual nodes 210 and virtual links 212, that are realized using an underlying physical network infrastructure of SPN-enabled network 204. In OONV architecture 200, different examples of VNOs 206 are shown. VNO1 206-1 may have a VNO owner that is cloud app 220 that is a SPN tenant. VNO2 206-2 may have a VNO owner that is network operator 222 that is a SPN tenant. VNO3 206-3 may have a VNO owner that is cloud provider 224 that is a SPN tenant. VNO4 206-4 may have a VNO owner that is SDN controller 226 that is a SPN tenant.

As shown in OONV architecture 200, SPN OS 202 may provide northbound APIs 232 (shown in FIG. 2 as arrows between VNOs 206 and respective SPN tenants) for SPN tenants. Specifically, northbound API 232-1 may be used by cloud app 220 for VNO 206-1; northbound API 232-2 may be used by network operator 222 for VNO 206-2; northbound API 232-3 may be used by cloud provider 224 for VNO 206-3; and northbound API 232-4 may be used by SDN controller 226 for VNO 206-4. SPN OS 202 may also provide southbound interfaces 234 (shown in FIG. 2 as by arrows between SPN OS 202 and SPN-enabled network 204) to SPN-enabled network 204. SPN OS 202 may also perform session management for northbound APIs 232 and southbound interfaces 234. SPN OS 202 may use northbound APIs 232 to provide SPN-based virtual network services to various SPN tenants including cloud apps 220, network operators 222, cloud providers 224, and SDN controller 226, among others. SDN controller 226 (or other network operating systems) may also be supported as one type of SPN application and may provide backward compatibility to existing SDN architectures. For southbound interfaces 234 of SPN OS 202, various protocols and/or control mechanisms may be used for interactions between SPN OS 202 and SPN-enabled network 204. For example, exemplary southbound interfaces 234-1, 234-2, 234-3 may represent any one or more of: OpenFlow, Simple Network Management Protocol (SNMP), Network Configuration Protocol (NETCONF), transaction language 1 (TL1), generalized multi-protocol label switching (GMPLS), or other vender-specific network management systems (NMS) and protocols, as desired.

In OONV architecture 200 of FIG. 2, advanced computing and software technologies may provide a desired level of performance and reliability. For example, certain database technologies (e.g., In-Memory Databases, GraphDB) may be adopted for resource management functionality associated with VNO pool 214 or VNO arbiter 230. Various software techniques, such as software techniques used for other types of OO programming, may be used for verification, debugging and testing of VNOs 206 during development. A multithreading environment may be used for execution management of VNO pool 214, in which an event handler for each VNO 206 may execute in a separate thread associated with VNO 206. Additionally, distributed server and OS technology may provide scalable performance, resiliency, efficiency, consistency, among other advantages, in SPN OS 202. Although SPN OS 202 may be implemented using known OO programming languages (e.g., Java™, C++, C#), a customized OO network programming language may be contemplated for use with SPN OS 202 and may be particularly well suited for efficient and streamlined implementation of VNOs 206 and SPN OS 202. Such a customized OO network programming language may provide comparable advantages as OO programming languages provide, and may include, for example, abstraction, encapsulation, inheritance, and polymorphism.

Certain architectural features of OONV architecture 200, as described herein, may be represented using an analogy to VM-based computing resource virtualization. For example, a VM in a datacenter may represent an analogous element as VNO 206 in a network implementing OONV architecture 200. A VM may represent a unit of computing software that executes on shared physical computing resources (processing resources, memory resources, storage resources, etc.), while VNO 206 may represent a unit of networking software that manages and controls shared physical network resources (switching resources, routing resources, add/drop resources, such as a reconfigurable optical add/drop multiplexer (ROADM), wireless resources, or media resources, such as electrical/optical/wireless links, etc.). Furthermore, the evolution of OONV architecture 200 or the OONV development environment may be represented in an analogous manner to the evolution of computing languages. For example, early low-level languages, such as assembly languages for computing applications, may correspond to previously used low-level network languages and tools, such as pre-SDN languages, SNMP, NETCONF, TL1, GMPLS, among others. These early adopted low-level tools may enable software development for applications close to the physical infrastructure such as the computing platform for computing languages or the physical network for network languages/tools, but may be less intuitive to use than more modern tools.

Then, similar to how procedural languages, such as C, Fortran, Pascal, BASIC, among others, were developed, presently used network programming tools, such as SDN and OpenFlow, for example, were introduced. However, the current network programming tools may be limited to defining the properties of a program entity (or a network entity) in terms of data structures that include a collection of variables or parameters. When procedural languages for software programming are used, data and operations on the data are separate, while the procedural methodology involves sending data to methods. Thus, procedural languages do not define the behaviors of the program entity and there is no concept of a class that encapsulates methods, as in OO languages and the current network programming tools also operate under such limitations.

The evolution of computing languages has continued with the availability of OO languages (e.g., JAVA, C++, C#), which enable a program entity to have properties and behaviors and be represented as an object belonging to a class. Using OO languages for software programming places data and certain operations that pertain to the data within a single entity called an object. In this manner, OO languages may enable development of highly-scalable software-programed systems that efficiently re-use both data and methods.

OONV architecture 200, as described herein, may enable a clear demarcation between network users and network providers. The network provider may manage network resources and may present current network conditions to the user through SPN OS 202. Each user's VN network request may be serviced as VNO 206 instantiated in SPN OS 202. By delegating more functions to VNOs 206, OONV architecture 200 may enable more decentralized and, therefore, more scalable network operation, while maintaining centralized management at VNO pool 214 or through VNO arbiter 230. Thus, various different kinds of VNOs 206 may be implemented that behave in a more self-administrative, autonomous fashion, and may be managed according to policy-based supervision.

As shown in FIG. 2, VNO 206 may be a representation of a virtual network service provided to a SPN tenant. VNO 206 may provide topology virtualization and address space virtualization for SPN-enabled network 204. VNO 206 may maintain persistence throughout a lifespan of the virtual network service provided by VNO 206, and thus, may provide desired stability and robustness. Furthermore, VNO 206 may provide functionality such as traffic engineering, resiliency, in-service reconfiguration, upgrade, re-optimization, live migration, among others. VNO 206 may be similar to an object in an OO language and may possess specific identities, properties, and behaviors. For example, an identity of VNO 206 may include a VNO identifier (ID), a tenant ID, among others. Properties of VNO 206 may include a virtual node list, a virtual node interface list, a virtual link list, a virtual address space, a routing table, a scheduler, among others. Depending on a level-of-transparency policy set for VNO 206, VNO 206 may also possess properties such as a physical network topology (e.g., 'as seen' from VNO 206), a virtual node to physical node mapping, a virtual node interface to physical node interface mapping, a virtual link to physical path mapping, a virtual address space to physical address space mapping, among others. Behaviors (or internal methods) of VNO 206 may include methods that are executed during VNO initialization, methods executed during VNO operation, and methods executed during VNO decommissioning.

In FIG. 2, a SPN tenant (represented by the exemplary SPN tenants: cloud app 220, network operator 222, cloud provider 224, and SDN controller 226) may have visibility and control over VNOs 206 associated with or 'owned by' the SPN tenant through SPN OS 202. The methods in VNO 206 may be either self-executable (such as scheduled reconfiguration, protection/restoration) or invoked by the VNO owner (such as live migration). In certain embodiments, VNO 206 may be designed or developed entirely as a new VNO. In other embodiments, VNO 206 may be generated from various predefined VNO templates (recipes), such as Single Big Switch, Fat Tree, Protected Ring, among other examples of VNO functionality. A VNO template may be similar to a class in an OO language and may provide similar advantages, such as abstraction, encapsulation, inheritance, and polymorphism. VNO 206 may interact with a VNO owner that is a SPN tenant through northbound APIs 232. VNO 206 may interact with VNO arbiter 230 through VNO pool-to-VNO arbiter interfaces 236. VNOs 206 may interact with SPN-enabled network 204 through southbound interfaces 234. Also, VNO 206 may interact with other VNOs 206 through inter-VNO interfaces 238. To the extent that a flow entity in SDN is comparable to VNOs 206 in SPN OS 202, inter-VNO interfaces 238 may represent communication functionality that is not comparable to functionality associated with SDN. For example, SDN, in general, may not allow (or may allow in a restricted manner) inter-SDN controller communications. Thus, enabling multiple VNOs 206 to interact autonomously among each other may represent an advantage of OONV architecture 200, that may enable more scalable SPN system design and operation, and may further enable new functions and services. For example, a SPN tenant may 'stitch' multiple VNOs 206 together to form a larger (multi-domain or multi-segment) virtual network. In another example, multiple VNOs 206 respectively owned by different SPN tenants may be enabled to 'negotiate' access to shared physical resources (e.g., in cases of oversubscription), which may provide overall economic benefits for the operation of OONV architecture 200.

In FIG. 2, OONV architecture 200 may include provisioning functionality. For example, a cloud provider may desire a virtual network for new cloud app 228. The cloud provider's resource orchestrator may obtain current network resource information from SPN OS 202 through an API command (e.g., OONVgetNetworkResourceInfo( )) for OONV architecture 200. It is noted that the network resource information may specify topology, bandwidth, delay, shared risk groups, among other features. Based on the received network resource information, the orchestrator may then create a new VNO in VNO pool 214. As noted previously, the new VNO may be created using a self-defined or a pre-defined VNO template. For example, using a pre-defined BigSwitch VNO template, a new VNO may be created using a corresponding API command, such as "OONVmyCloudVN=new BigSwitchVNO(IDs, virtual node and link properties, etc.)". In response, a BigSwitch-type VNO may be generated and referred to "myCloudVN" and may execute initialization methods and functions. The new BigSwitch-type VNO may have a specified number of virtual nodes, while full-mesh virtual links with a specified capacity may be automatically populated between associated virtual node pairs. Also, various pre-defined functions or methods may also be included in the new BigSwitch-type VNO. After the new BigSwitch-type VNO is instantiated, VNO arbiter 230 may perform VNO verification. The VNO verification may verify that fields and code in VNO 206 are valid and do not include logic flaws, such as race conditions, referred to as a "sanity check" for VNO 206. The VNO verification may check whether VNO 206 may be serviced under current network condition, referred to as a "serviceability check" for VNO 206. When the serviceability check gives a positive result, the VNO verification may list valid service patterns and associated properties, constraints, and costs, referred to as a "service proposition" for VNO 206. A "service pattern" for VNO 206 may be a mapping pattern that may include a virtual node-to-physical node mapping list, a virtual link-to-physical path mapping list, or other attributes such as node and link properties, availability, reliability, cost, among others.

In OONV architecture 200 shown in FIG. 2, VNO arbiter 230 may write verification results in VNO 206 and may return control to an entity requesting creation of VNO 206. In the previous example, the verification results may be written to the newly generated VNO (myCloudVN), while control is returned to the orchestrator. The orchestrator may review the verification results, may decide on the desired service pattern based on preferences, such as preferred mapping sites, among others, and service pattern conditions, such as cost, availability, among others. Then, the orchestrator may write the desired service pattern to myCloudVN. At the time the VN service is activated, the orchestrator may send an API command to SPN OS 202 to request service activation. Sending the API command may be accomplished by calling a VNO's service activation function, such as OONVmyCloudVN.activateService(now), where for scheduled activation, a future time and date may be specified instead of the 'now' parameter. VNO arbiter 230, in turn, may receive the service activation request from VNO 206. In the previous example, myCloudVN in VNO pool 214 may send an OONVactivateService(now) request to VNO arbiter 230.

In OONV architecture 200, VNO arbiter 230 may also perform admission control and physical network resource allocation for VNO 206. Based on a service pattern selected by VNO 206, VNO arbiter 230 may perform virtual node/link-to-physical node/path mapping, virtual-to-physical address translation, and other conversions. Certain mapping and conversation tables may be stored in a database available to VNO arbiter 230, or may be stored in VNO 206. Then VNO arbiter 230 may send control commands to SPN-enabled network 204 through southbound interfaces 234 to configure or allocate physical network resources. During such processes, VNO arbiter 230 may perform other operations, such as physical network resource management and scheduling, network-wide policy enforcement, security and authentication, authorization and accounting, among other arbitration tasks. Depending on a desired level of control or transparency allowed for VNO 206, at least a portion of the functionality of VNO arbiter 230 may be delegated to VNO 206. For example, when VNO 206 is allowed to have direct access to SPN-enabled network 204, the virtual-to-physical conversion and SPN-enabled network configuration commands may be carried out by VNO 206 itself, instead of going through VNO arbiter 230, which may be especially useful for certain VNO functions. For instance, when VNO 206 implements fast protection or restoration, VNO 206 may use an internal method, such as OONVmonitorPhysicalNetwork( ), to monitor and detect network failures, and then use another internal method, such as OONVremapTo(protectionMappingPattern) or OONVrestoreFrom(alternativeMappingPatterns), to rapidly reconfigure a portion of SPN-enabled network 204 and remap VNO 206 to alternative network resources.

When a cloud provider desires to deactivate VNO 206, a function such as OONVmyCloudVN.deactivateService(now) may be used to deactivate a current virtual-to-physical mapping and release the physical resources associated with VNO 206. VNO 206 may be reactivated by recalling a function such as OONVmyCloudVN.activateService(now). When the cloud provider wants to permanently terminate VNO 206, a function such as OONVmyCloudVN.decommission(now) may be used to delete VNO 206 from VNO pool 214, for example. VNO arbiter 230 may monitor and may communicate with VNOs 206 in VNO pool 214. When certain VNOs 206 behave erratically (due to VNO functional bugs, unexpected network conditions, among other causes), VNO arbiter 230 may forcefully terminate erratic or erroneous VNOs 206.

In summary, Table 1 below lists certain non-limiting technical differences between SDN and SPN for OONV architecture 200.

TABLE 1

Certain Non-limiting Technical Differences between SDN and SPN for OONV architecture 200.

| Software-defined networking (SDN) | Software-programmed networking (SPN) for OONV architecture 200 |
|---|---|
| VNs having identities and properties. | VNOs having identities, properties, and behaviors. |
| VN defined as a collection of logical and physical properties and operated externally to SDN controller. | VNO programmed as a self-contained object that operates autonomously. |
| New VNs defined grammatically, similar to procedural programming languages. | New VNOs instantiated programmatically, similar to OO programming languages. |
| No persistence and autonomous control of VNs. | Enables persistence and autonomous control of VNOs. |
| Interactions go through a centralized SDN controller. | Enables interactions between a VNO, a VNO owner, and/or a SPN-enabled network slice to be performed directly (without direct involvement of a VNO arbiter). |
| Communications among VNs go through the centralized SDN controller. No inter-VN interfaces. | Enables inter-VNO communications through inter-VNO interfaces. |
| Generally does not include VNF (virtualized network function). | Enables VNF as an intrinsic function of the VNO. |

As disclosed herein, OONV architecture 200 may provide support for SDN, such as OpenFlow. Backward compatibility for OpenFlow or other conventional SDN protocols may be supported by SPN for OONV architecture 200, as disclosed herein, by using compatibility functions in individual VNO 206. For example, the myCloudVN VNO may be created with OpenFlow-enabled, such that a group of OpenFlow functions are automatically added in the myCloudVN VNO. The group of OpenFlow functions may include OFPacketInHandler( ), OFPacketOutHandler( ); OFFlowModHandler( ); and OFFlowExpiredHandler( ), among other SDN/OpenFlow functions. In this manner, groups of supported OpenFlow functions may serve as a 'built-in' OpenFlow controller for VNO 206. VNO 206 may use OpenFlow functions to interact with an OpenFlow-compatible physical network through VNO arbiter 230, where VNO arbiter 230 may operate in a similar manner to OpenVirtex (NetVisor) or FlowN, which perform virtual-to-physical mapping and address space translation. It is noted that for VNOs 206 with more transparent virtualization, VNOs 206 may hold mapping and address space information and may directly interact with the OpenFlow-compatible physical network. VNO 206 may support multiple SDN functions simultaneously. For example, in addition to OpenFlowHandlers( ), the myCloudVN VNO may also support other SDN protocols such as Fujitsu's SDN by including FujitsuSDNHandlers( ) functions.

As disclosed herein, OONV architecture 200 may provide support for conventional network operation. Backward compatibility to conventional network provisioning operations may be supported by SPN for OONV architecture 200, as disclosed herein, by providing a special VNO 206 dedicated to each type of conventional network provisioning. For example, a GMPLSOpticalVN VNO may be created on a SPN-enabled optical network that supports GMPLS commands. A portion of optical nodes or optical links may be assigned to the GMPLSOpticalVN VNO to form a physical optical network slice, which may appear as a real physical optical network to an owner of the GMPLSOpticalVN VNO. The virtual-to-physical mapping may be fully transparent; in other words, the physical node/link IDs may be identical to the virtual/link node IDs. When a conventional network operator sends a conventional network provisioning command to the GMPLSOpticalVN VNO, such as a 'lightpath setup' command in GMPLS, the GMPLSOpticalVN VNO may invoke the same command to a slice of the optical network through southbound interfaces 234. The underlying optical nodes may then follow the GMPLS commands from the GMPLSOpticalVN VNO to setup the desired lightpath.

As disclosed herein, OONV architecture 200 may provide native support for oversubscription. In an analogous manner as multiple software processes, such as tasks, threads, etc., run on the same CPU, or in a similar manner as multiple VMs run on the same physical server, multiple VNOs 206 may share the same physical network resources in a time or space-sharing arrangement, which may define oversubscription of VNOs 206. For example, packet-based VNO oversubscription may be realized by statistical multiplexing, while circuit-based VNO oversubscription may be realized by statistical sharing. While support for oversubscription may be possible in SDN, such support may involve significant challenges or difficulties. In typical embodiments, the centralized SDN controller may be forced to manage a sharing relationship among the virtual network entities, manage a reconfiguration schedule for the virtual networks, and perform reconfigurations for the virtual networks, which may be relatively frequent. For example, when a large number of virtual networks (e.g., 1 million virtual networks) coexist in the same network, every 10 or 100 virtual networks may share some common physical resources, and thus, may need to be reconfigured every minute or every hour, which may overload the SDN controller or lead to undesirable levels of SDN performance.

In OONV architecture 200, oversubscription may be realized by VNO arbiter 230 when admission control and resource allocation for SPN-enabled network 204 is performed for each respective VNO 206. When VNO 206 does not allow oversubscription, dedicated network resources may be allocated to VNO 206. When VNO 206 allows oversubscription (e.g., the VNO owner opts-in for oversubscription service for lower price), at least a portion of network resources allocated to VNO 206 may be shared with (or reallocated to) other VNOs 206. In case of oversubscription, the sharing schedule (e.g., every other minute) and policy (e.g., first-come-first-serve) may be written in a VNO's service pattern. After service activation, each VNO 206 may utilize network resources based on the active service pattern, and may share the physical resources with other VNOs 206 without intervention by VNO arbiter 230. Depending on service types, multiple VNOs 206 sharing common resources may interact with each other to negotiate or arbitrate and schedule resource usage through inter-VNO communication in an autonomous manner. VNO arbiter 230 may be involved when VNO 206 makes a change to the VNO's service pattern (e.g., modifies dedicated resources with respect to shared resources). VNO arbiter 230 may also perform network-wide policy enforcement to ensure that VNOs 206 are using network resources properly or that the network resources are not oversubscribed (oversold) beyond some other constraint, such as a service-level agreement (SLA) with a VNO owner, for example.

As disclosed herein, OONV architecture 200 may provide support for traffic engineering. Traffic engineering and/or load balancing functionality may be supported by OONV architecture 200, as disclosed herein, by VNOs 206. The virtual network topology of VNO 206 may appear identical to a 'physical topology'. Therefore, as long as no changes are made to the virtual network topology and associated properties, such as link capacity, admission control and physical resource allocation by VNO arbiter 230 may not be involved. When a SDN tenant wants to reroute certain packet flows and/or circuits, the SDN tenant may makes changes to a routing table or packet forwarding/circuit forwarding rules of VNO 206 owned by the SDN tenant. Such changes may be automatically converted to associated forwarding/switching reconfigurations in network resources of SPN-enabled network 204 using a virtual-to-physical mapping and a conversation table. Then VNO 206 may send reconfiguration commands to SPN-enabled network 204 through southbound interface 234.

As disclosed herein, OONV architecture 200 may provide support for network protection/restoration. Network protection and network restoration may be supported by OONV architecture 200, as disclosed herein, by methods within VNOs 206. Protection may be realized by specifying one or more protection service patterns (PSPs) in VNO 206 and allocating dedicated or high-priority resources of SPN-enabled network 204 to the PSPs. Restoration may be realized by specifying one or more restoration service patterns (RSPs) in VNO 206 without allocating dedicated or high-priority resources of SPN-enabled network 204 to the RSPs. VNOs 206 that support protection/restoration may also implement monitoring functions, such as OONVmonitorPhysicalNetwork( ), to monitor and detect network failures through the southbound interface. Once network failures are detected, affected VNOs 206 may automatically switch to the VNOs' PSPs or RSPs. In case of protection, VNOs 206 may switch to their PSPs instantly without intervention by VNO arbiter 230. In case of restoration, VNOs 206 may first invoke a VNO verification procedure at VNO arbiter 230 to determine valid RSPs, and then, determine allocated restoration resources on-demand. For protection/restoration, VNO verification technology may play an important role. Because it may be challenging to provide sufficient reliability in a virtualized environment, VNO verification may prevent race conditions among VNOs 206 under normal circumstances and during network failure conditions. In one embodiment, a VNO verification solution may provide new services such as "graceful protection/restoration" by calculating PSPs/RSPs that provide finer-granular service resiliency.

As disclosed herein, OONV architecture 200 may provide support for scheduled service. Scheduled service may be supported by OONV architecture 200, as disclosed herein, by VNOs 206. When VNO 206 requests immediate service activation, VNO 206 may call a service function, such as OONVactivateService(now) right after VNO initialization. VNOs 206 that request advance service activation may invoke OONVactivateService(future time & date) after VNO initialization. VNO arbiter 230 may schedule future resources on SPN-enabled network 204 available for VNOs 206 requesting advance service. A OONVactivateService( ) function at VNO 206 may invoke service activation at a specified time & date. VNOs 206 that request periodical service activation may invoke OONVactivateService(serviceScheduler). OONVserviceScheduler may be a logical entity (such as a list, table, database, or a schedule object) that may specify detailed service activation/deactivation schedules or conditions. VNO arbiter 230 may schedule future resources for SPN-enabled network 204. A OONVactivateService( ) function at VNO 206 may also invoke service activation and deactivation periodically.

As disclosed herein, OONV architecture 200 may provide native support for VN live migration. SDN-based approaches may involve building a separate manager on top of a SDN controller to support VN live migration, such as Live Migration of Ensembles (LIME) on top of the Floodlight controller. Different from traffic engineering, live migration and other similar networking functions (like virtual network redesign) may involve changes to a VN. VN live migration may maintain an existing VN topology but may involve remapping at least some virtual nodes to different physical nodes. VN redesign may change the VN topology: add/remove virtual nodes and virtual links, increase/decrease virtual link capacity, etc. VN live migration may be supported by a reconfiguration function in VNO 206. Using the previous OONVmyCloudVN example, the OONVmyCloudVN VNO may invoke OONVmyCloudVN-.reconfigVNO(new set of virtual node and link properties). The OONVmyCloudVN VNO may automatically generate new service patterns (such as new virtual-to-physical node mapping patterns) according to the new set of virtual node and link properties. VNO arbiter 230 may perform OONVmyCloudVN verification and may return valid service patterns. OONVmyCloudVN may select one valid service pattern and may reconfigure service using a command like OONVmyCloudVN.reconfigService(selectedServicePattern). VNO arbiter 230 may deactivate the old service and may reactive service with new service pattern.

As disclosed herein, OONV architecture 200 may provide support for network reoptimization. The SPN service provider may use SPN OS 202 to reoptimize physical network utilization or perform network maintenance/upgrade without VNO service interruption. The reoptimization may be realized by invoking VNO service pattern remapping from VNO arbiter 230. For example, when the SPN service provider installs a new-technology physical path and wants to terminate the old-technology path, the SPN service provider may look up VNO pool 214 to list VNOs 206 that have virtual links mapped on the old path. The SPN service provider may then use VNO arbiter 230 to rewrite the old-path VNO's working service patterns and may invoke OONVreconfigService( ) function for the old-path VNOs to activate the new service patterns. In some embodiments, network reoptimization operations may be invisible to the VNO owners. In other embodiments, the VNO owners may be notified of network reoptimization operations as maintenance alerts. By implementing such VNO service remapping in a systemic way, automated network-wide reoptimization, such as optical spectrum defragmentation may be performed with OONV architecture 200.

Figure 3:
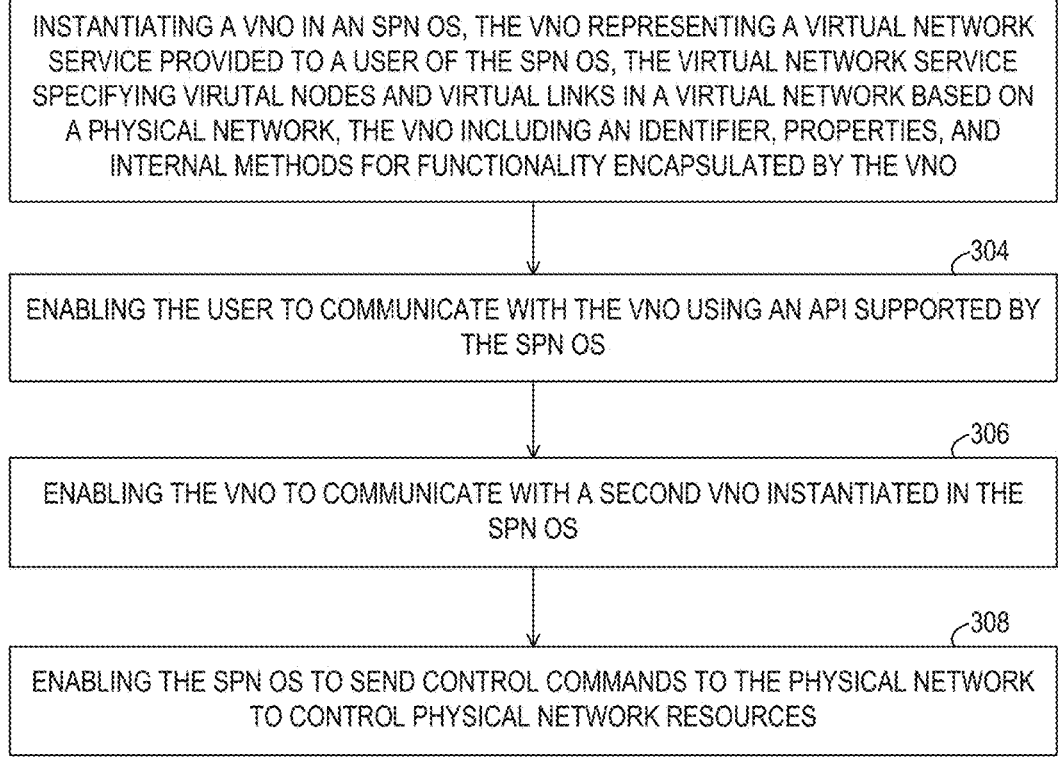
FIG. 3 is a flow chart of selected elements of an embodiment of a method for implementing object-oriented network virtualization.

Referring now to FIG. 3, a block diagram of selected elements of an embodiment of method 300 for providing virtual network services, as described herein, is depicted in flowchart form. At least certain operations in method 300 may be performed using OONV architecture 200 (see FIG. 2), for example, by SPN OS 202 executing on an OONV controller (see also FIG. 5). In some embodiments, at least certain operations in method 300 may be performed by VNO arbiter 230. It is noted that certain operations described in method 300 may be optional or may be rearranged in different embodiments.

Method 300 may begin by instantiating (operation 302) a VNO in a SPN OS, the VNO representing a virtual network service provided to a user of the SPN OS, the virtual network service specifying virtual nodes and virtual links in a virtual network based on a physical network, the VNO including an identifier, properties, and internal methods for functionality encapsulated by the VNO. Method 300 may include enabling (operation 304) the user to communicate with the VNO using an API supported by the SPN OS. Method 300 may include enabling (operation 306) the VNO to communicate with a second VNO instantiated in the SPN OS. Method 300 may include enabling (operation 308) the SPN OS to send control commands to the physical network to control physical network resources.

Figure 4:
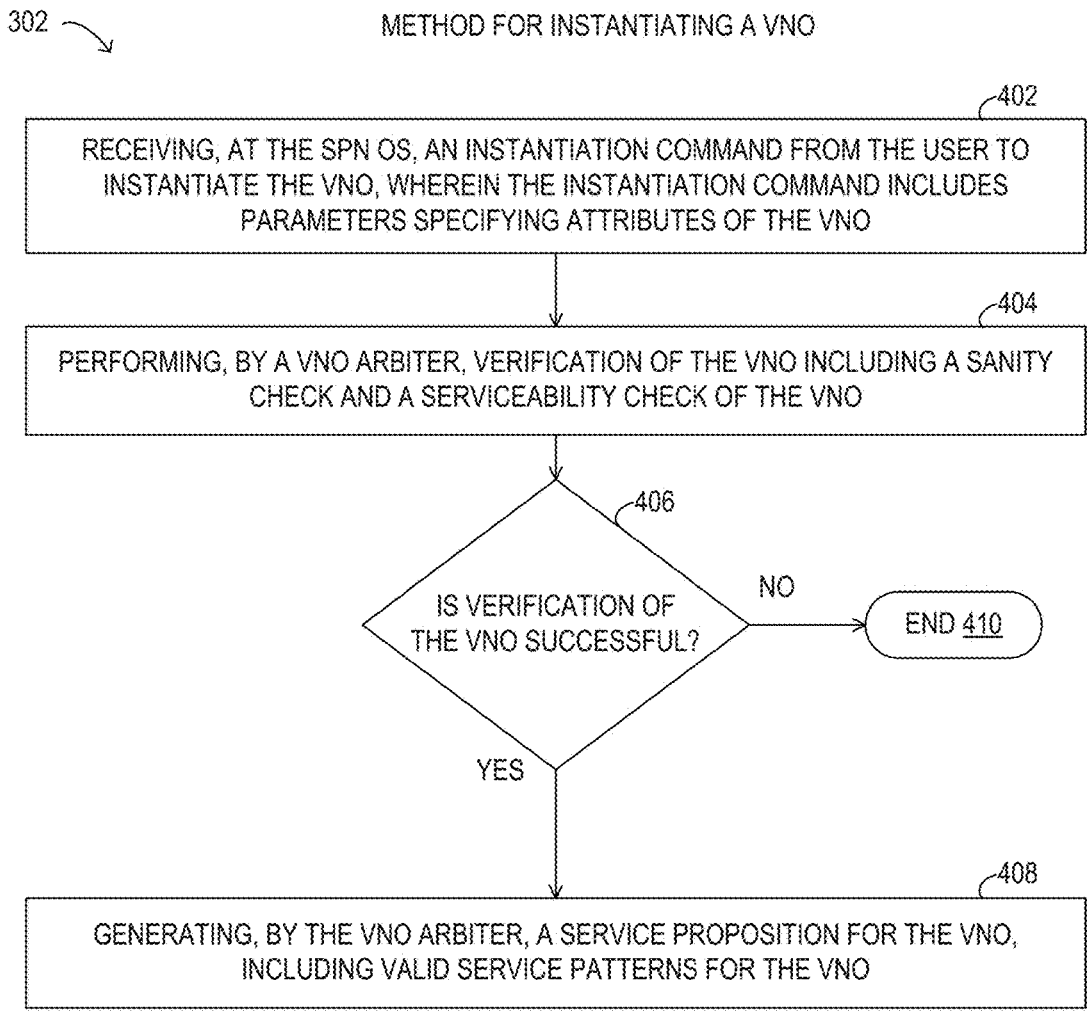
FIG. 4 is a flow chart of selected elements of an embodiment of a method for instantiating a virtual network object.

Referring now to FIG. 4, a block diagram of selected elements of an embodiment of method 302 for providing virtual network services, as described herein, is depicted in flowchart form. Method 302 may represent an embodiment of operation 302 in method 300 (see FIG. 3). It is noted that certain operations described in method 302 may be optional or may be rearranged in different embodiments.

Method 302 may begin by receiving (operation 402), at the SPN OS, an instantiation command from the user to instantiate the VNO, wherein the instantiation command includes parameters specifying attributes of the VNO. Responsive to the instantiation command, method 302 may include performing (operation 404), by a VNO arbiter included in the SPN OS, verification of the VNO, including a sanity check and a serviceability check of the VNO. Then, in method 302, a decision may be made whether the verification of the virtual network object is successful (operation 406). When the result of operation 406 is NO, method 302 may end (operation 410). When the result of operation 406 is YES, method 302 may include generating (operation 408), by the VNO arbiter, a service proposition for the VNO, including valid service patterns for the VNO.

Figure 5:
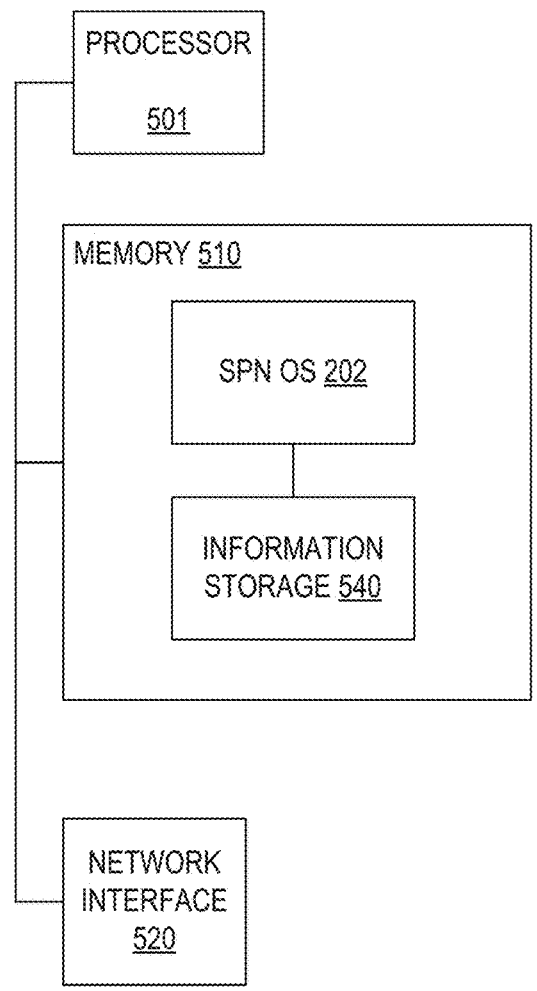
FIG. 5 is a block diagram of selected elements of an embodiment of an OONV controller.

Referring now to FIG. 5, a block diagram of selected elements of an embodiment of OONV controller 500 is illustrated. In FIG. 5, OONV controller 500 is represented as a computer system including physical and logical components for implementing OONV architecture 200, as described herein, and may accordingly include processor 501, memory 510, and network interface 520. Processor 501 may represent one or more individual processing units and may execute program instructions, interpret data, process data stored by memory 510 or OONV controller 500. It is noted that OONV controller 500 may be implemented in different embodiments. For example, in some embodiments, OONV controller 500 may be implemented using network element 102 (see FIG. 1). In particular embodiments, memory 510 may represent a virtual machine executing on processor 501 using a hypervisor that enables concurrent execution of multiple virtual machines.

In FIG. 5, memory 510 may be communicatively coupled to processor 501 and may comprise a system, device, or apparatus suitable to retain program instructions and/or data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 510 may include different numbers of physical storage devices, in various embodiments.

As shown in FIG. 5, memory 510 may include SPN OS 202, as described above with respect to FIG. 2. Information storage 540 may store various data and parameters, such as data and parameters associated with SPN OS 202.

As disclosed herein, OONV may involve creating and operating VNOs using a SPN OS. A VNO may be a complete representation of a virtual network service provided under the SPN OS. A VNO may have a unique identity and properties, along with an internal set of methods for executing functionality encapsulated by the VNO. A VNO may exhibit persistence and autonomous control to enable improved virtual network services.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing virtual network services, comprising:
    instantiating, in an operating system supporting software-programmed networking, a virtual network object that includes an identifier, properties, and internal methods for functionality encapsulated by the virtual network object, wherein the virtual network object represents a virtual network service provided to a user of the operating system, and wherein the virtual network service specifies virtual nodes and virtual links in a virtual network based on a physical network and the internal methods for functionality include operational functions for the virtual network object to perform network protection and restoration by monitoring and detecting network failures through an interface with the physical network and when a network failure is detected, executing a protection service pattern or a restoration service pattern for the physical network;
    enabling the user to communicate with the virtual network object using an application programming interface supported by the operating system;
    enabling the operating system to send control commands to the physical network to control physical network resources; and
    enabling, by an arbiter included in the operating system, network reoptimization of the physical network for a plurality of virtual network objects, wherein at least some of the physical network resources are reconfigured to new physical network resources,
    wherein a protection service pattern and a restoration service pattern is a mapping pattern that includes a virtual node-to-physical node mapping list, a virtual link-to-physical path mapping list, and node attributes, and
    wherein the protection service pattern specifies allocating dedicated or high-priority resources of the physical network to the protection service pattern and wherein the restoration service pattern specifies one or more restoration service patterns without allocating dedicated or high-priority resources of the physical network to the restoration service pattern.

2. The method of claim 1, wherein instantiating the virtual network object further comprises:
    receiving, at the operating system, an instantiation command from the user to instantiate the virtual network object, wherein the instantiation command includes parameters specifying attributes of the virtual network object;
    responsive to the instantiation command, performing, by the arbiter, verification of the virtual network object, including a sanity check and a serviceability check of the virtual network object; and
    when the verification of the virtual network object is successful, generating, by the arbiter, a service proposition for the virtual network object, including valid service patterns for the virtual network object.

3. The method of claim 1, wherein the virtual network service includes:
    topology virtualization of the physical network; and
    address space virtualization of the physical network.

4. The method of claim 1, wherein the internal methods for functionality encapsulated by the virtual network object include:
    initialization functions for the virtual network object; and
    decommissioning functions for the virtual network object.

5. The method of claim 4, wherein the operational functions for the virtual network object are selected from at least one of:
    a software-defined networking protocol;
    packet-based oversubscription using statistical multiplexing of the physical network resources;
    circuit-based oversubscription using statistical sharing of the physical network resources;
    forwarding rules for network traffic on the physical network;
    scheduled service for the physical network; and
    live migration, including remapping at least some of the virtual nodes to different physical network resources during operation of the physical network.

6. The method of claim 2, further comprising:
    enabling the virtual network object to communicate with a second virtual network object instantiated in the operating system.

7. A physical network comprising an object oriented network virtualization (OONV) controller for providing virtual network services, the OONV controller for:
    instantiating, in an operating system supporting software-programmed networking, a virtual network object that includes an identifier, properties, and internal methods for functionality encapsulated by the virtual network object, wherein the virtual network object represents a virtual network service provided to a user of the operating system, and wherein the virtual network service specifies virtual nodes and virtual links in a virtual network based on the physical network and the internal methods for functionality include operational functions for the virtual network object to perform network protection and restoration by monitoring and detecting network failures through an interface with the physical network and when a network failure is detected, executing a protection service pattern or a restoration service pattern for the physical network;
    enabling the user to communicate with the virtual network object using an application programming interface supported by the operating system;
    enabling the operating system to send control commands to the physical network to control physical network resources; and
    enabling, by an arbiter included in the operating system, network reoptimization of the physical network for a plurality of virtual network objects, wherein at least some of the physical network resources are reconfigured to new physical network resources,
    wherein a protection service pattern and a restoration service pattern is a mapping pattern that includes a virtual node-to-physical node mapping list, a virtual link-to-physical path mapping list, and node attributes, and
    wherein the protection service pattern specifies allocating dedicated or high-priority resources of the physical network to the protection service pattern and wherein the restoration service pattern specifies one or more restoration service patterns without allocating dedicated or high-priority resources of the physical network to the restoration service pattern.

8. The physical network of claim 7, wherein instantiating the virtual network object further comprises:
   receiving, at the operating system, an instantiation command from the user to instantiate the virtual network object, wherein the instantiation command includes parameters specifying attributes of the virtual network object;
   responsive to the instantiation command, performing, by the arbiter, verification of the virtual network object, including a sanity check and a serviceability check of the virtual network object; and
   when the verification of the virtual network object is successful, generating, by the arbiter, a service proposition for the virtual network object, including valid service patterns for the virtual network object.

9. The physical network of claim 7, wherein the virtual network service includes:
   topology virtualization of the physical network; and
   address space virtualization of the physical network.

10. The physical network of claim 7, wherein the internal methods for functionality encapsulated by the virtual network object include:
   initialization functions for the virtual network object; and
   decommissioning functions for the virtual network object.

11. The physical network of claim 10, wherein the operational functions for the virtual network object are selected from at least one of:
   a software-defined networking protocol;
   packet-based oversubscription using statistical multiplexing of the physical network resources;
   circuit-based oversubscription using statistical sharing of the physical network resources;
   forwarding rules for network traffic on the physical network;
   scheduled service for the physical network; and
   live migration, including remapping at least some of the virtual nodes to different physical network resources during operation of the physical network.

12. The physical network of claim 8, wherein the OONV controller is further for:
   enabling the virtual network object to communicate with a second virtual network object instantiated in the operating system.

13. The physical network of claim 7, wherein the OONV controller is one of a network element or a virtual machine executing on a hypervisor.

14. An object oriented network virtualization (OONV) controller for providing virtual network services, the OONV controller for:
   instantiating, in an operating system supporting software-programmed networking, a virtual network object that includes an identifier, properties, and internal methods for functionality encapsulated by the virtual network object, wherein the virtual network object represents a virtual network service provided to a user of the operating system, and wherein the virtual network service specifies virtual nodes and virtual links in a virtual network based on the physical network;
   enabling the user to communicate with the virtual network object using an application programming interface supported by the operating system and the internal methods for functionality include operational functions for the virtual network object to perform network protection and restoration by monitoring and detecting network failures through an interface with the physical network and when a network failure is detected, executing a protection service pattern or a restoration service pattern for the physical network;
   enabling the operating system to send control commands to the physical network to control physical network resources; and
   enabling, by an arbiter included in the operating system, network reoptimization of the physical network for a plurality of virtual network objects, wherein at least some of the physical network resources are reconfigured to new physical network resources,
   wherein a protection service pattern and a restoration service pattern is a mapping pattern that includes a virtual node-to-physical node mapping list, a virtual link-to-physical path mapping list, and node attributes, and
   wherein the protection service pattern specifies allocating dedicated or high-priority resources of the physical network to the protection service pattern and wherein the restoration service pattern specifies one or more restoration service patterns without allocating dedicated or high-priority resources of the physical network to the restoration service pattern.

15. The OONV controller of claim 14, wherein instantiating the virtual network object further comprises:
   receiving, at the operating system, an instantiation command from the user to instantiate the virtual network object, wherein the instantiation command includes parameters specifying attributes of the virtual network object;
   responsive to the instantiation command, performing, the arbiter, verification of the virtual network object, including a sanity check and a serviceability check of the virtual network object; and
   when the verification of the virtual network object is successful, generating, by the arbiter, a service proposition for the virtual network object, including valid service patterns for the virtual network object.

16. The OONV controller of claim 14, wherein the virtual network service includes:
   topology virtualization of the physical network; and
   address space virtualization of the physical network.

17. The OONV controller of claim 14, wherein the internal methods for functionality encapsulated by the virtual network object include:
   initialization functions for the virtual network object; and
   decommissioning functions for the virtual network object.

18. The OONV controller of claim 17, wherein the operational functions for the virtual network object are selected from at least one of:
   a software-defined networking protocol;
   packet-based oversubscription using statistical multiplexing of the physical network resources;
   circuit-based oversubscription using statistical sharing of the physical network resources;
   forwarding rules for network traffic on the physical network;
   scheduled service for the physical network; and
   live migration, including remapping at least some of the virtual nodes to different physical network resources during operation of the physical network.

19. The OONV controller of claim 15, wherein the OONV controller is further for:

enabling the virtual network object to communicate with a second virtual network object instantiated in the operating system.

20. The OONV controller of claim 15, wherein the OONV controller is one of a network element or a virtual machine executing on a hypervisor.

* * * * *